US008171966B2

(12) United States Patent
Kawakami

(10) Patent No.: US 8,171,966 B2

(45) Date of Patent: May 8, 2012

(54) PNEUMATIC TIRE AND METHOD FOR MANUFACTURING THE SAME

(75) Inventor: Kazuki Kawakami, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1115 days.

(21) Appl. No.: 12/033,131

(22) Filed: Feb. 19, 2008

(65) Prior Publication Data

US 2009/0173419 A1 Jul. 9, 2009

(30) Foreign Application Priority Data

Jan. 8, 2008 (JP) ................................ 2008-001468

(51) Int. Cl.

| | |
|---|---|
| ***B29D 30/60*** | (2006.01) |
| ***B60C 1/00*** | (2006.01) |
| ***B60C 11/00*** | (2006.01) |
| ***B60C 19/08*** | (2006.01) |

(52) U.S. Cl. ............ 152/152.1; 152/209.5; 152/DIG. 2; 156/117; 156/130

(58) Field of Classification Search ............... 152/152.1, 152/209.5, DIG. 2; 156/117, 130
See application file for complete search history.

(56) References Cited

U.S. PATENT DOCUMENTS

| | | | | |
|---|---|---|---|---|
| RE25,349 E * | 3/1963 | Hanson | ......................... | 156/130 |
| 3,177,918 A * | 4/1965 | Holman | ......................... | 156/117 |
| 5,942,069 A | 8/1999 | Gerresheim et al. | | |
| 6,269,854 B1 | 8/2001 | Matsuo et al. | | |
| 6,415,833 B1 | 7/2002 | Komatsu | | |
| 2001/0035255 A1* | 11/2001 | Sergel et al. | .................. | 156/130 |
| 2006/0042733 A1* | 3/2006 | Matsui | .......................... | 156/130 |
| 2006/0096697 A1* | 5/2006 | Miki | ............................ | 156/130 |
| 2007/0017615 A1* | 1/2007 | Nobuchika et al. | ........ | 152/152.1 |
| 2008/0006356 A1* | 1/2008 | Takahashi et al. | ............ | 156/130 |
| 2009/0314401 A1* | 12/2009 | Hitotsuyanagi et al. | ...... | 156/117 |
| 2010/0012242 A1* | 1/2010 | Kudo et al. | ................ | 152/152.1 |

FOREIGN PATENT DOCUMENTS

| | | |
|---|---|---|
| EP | 1 657 050 | 5/2006 |
| EP | 1 738 893 | 1/2007 |
| JP | 09-71112 | 3/1997 |
| JP | 10-81110 | 3/1998 |
| JP | 10-175403 | 6/1998 |
| JP | 10-323917 | * 12/1998 |
| JP | 11-227415 | * 8/1999 |
| JP | 2003-326614 | * 11/2003 |
| JP | 2004-338621 | * 12/2004 |

OTHER PUBLICATIONS

Machine translation for Japan 2004-338621 (no date).*
Machine translation for Japan 2003-326614 (no date).*
Machine translation for Japan 11-227415 (no date).*
Machine translation for Japan 10-323917 (no date).*

* cited by examiner

*Primary Examiner* — Steven D Maki
(74) *Attorney, Agent, or Firm* — Fish & Richardson P.C.

(57) ABSTRACT

A pneumatic tire according to the invention includes a cap rubber 12 as a non-conductive rubber layer and a conductive layer 13 that extends from the tread surface to the bottom surface of the cap rubber 12 through the cap rubber 12. The conductive layer 13 has a main portion **13*a* extending from the tread surface toward the inner periphery of the tire, and plural branch portions 13*b* branched from the main portion 13*a* and extending toward the outer periphery of the tire. At least, one of the branch portions 13*b*** is exposed to the tread surface.

7 Claims, 4 Drawing Sheets

PNEUMATIC TIRE AND METHOD FOR MANUFACTURING THE SAME

BACKGROUND OF THE INVENTION

1. Field of the Invention

The invention relates to a pneumatic tire in which at least an outer periphery portion of the tire in a tread portion is formed of a non-conductive rubber layer, and a method for manufacturing a pneumatic tire.

2. Description of the Related Art

Recently, there have been proposed a pneumatic tire including a tread rubber blended with silica at a high ratio in order to reduce the rolling resistance that largely affects the fuel consumption of a vehicle and/or to increase braking performance (wet braking performance) on a wet road surface. However, compared to a tread rubber blended with carbon black at a high ratio, the electric resistance of such tread rubber is high, and accordingly, static charge generated on a vehicle body or the tire is prevented from being released to the road surface. As a result, problems like radio noises tend to occur.

There has been developed a pneumatic tire provided with a solution of the electric resistance problem in such a manner that a conductive layer blended with carbon black or the like is formed within a non-conductive tread rubber blended with silica or the like. For example, in pneumatic tires disclosed in Japanese Unexamined Patent Publication (Kokai) No. 9-71112, Japanese Unexamined Patent Publication (Kokai) No. 10-81110 and Japanese Unexamined Patent Publication (Kokai) No. 10-175403, a non-conductive tread rubber is formed with a conductive layer extending in a diameter direction of the tire to release the static charge to the road surface through the conductive layer. The conductive layer extends from a tread surface to a bottom surface through the tread rubber and is connected to conductive base rubber or sidewall rubber constituting a conductive path for releasing the static charge.

In a manufacturing process of such pneumatic tire provided with electric resistance solution, when the tire is subjected to a curing process, an end portion of the conductive layer to be exposed to the tread surface might be covered with a thin film of the non-conductive rubber in a so-called sheathed state. When such tire is practically used as it is, in an initial stage of wear, the releasing function of the static charge may fail causing a problem such as radio noises.

As a result of investigation, it was found that such sheath phenomenon tends to occur in a center portion, mediate portion and shoulder portion in the tread rubber in this order. The reason of this is understandable as described below. That is, in curing process of the tire, as cord angle of the belt layer changes due to the expansion of diameter of the tire, the tread rubber aggregates in the center portion. Since the diameter of the tire expands larger in the center portion, mediate portion, shoulder portion in this order, in the center portion where the diameter expands larger, the ratio of aggregation of the rubber is larger and tends to get in a sheathed state.

The above problem of sheath can be prevented by restricting the location where the conductive layer is exposed to the shoulder portion. In this case, such a request that the conductive layer be exposed in the center portion or mediate portion is not satisfied. Even when the conductive layer is exposed in a groove, the problem cannot be solved. Since selection of exposing location of the conductive layer depends on a pattern design somewhat, and in view of ensuring the flexibility of the pattern design, it is not desirable that the exposing location of the conductive layer is limited to a specific location.

SUMMARY OF THE INVENTION

The invention has been proposed in view of the above circumstances. It is an object to provide a pneumatic tire capable of reliably releasing static charge irrespective of exposed location of conductive layer from initial stage of wear, and to provide a method for manufacturing the same.

The above objects can be achieved by the invention as described below. That is, a pneumatic tire according to the invention includes a non-conductive rubber layer constituting at least an outer periphery portion of the tire in a tread portion; and a conductive layer extending from a tread surface to a bottom surface or side face of the non-conductive rubber layer through the non-conductive rubber layer, wherein the conductive layer has a main portion extending from the tread surface toward the inner periphery of the tire and a plurality of branch portions branched from the main portion and extending toward the outer periphery of the tire, and at least one of the branch portions is exposed to the tread surface.

The pneumatic tire according to the invention can release the static charge generated on a vehicle body and/or the tire to the road surface through the conductive layer extending from the tread surface to the bottom surface or side face of the non-conductive rubber layer. Also, since the conductive layer has the main portion and the branch portions as described above, the conductive layer can be exposed to the tread surface at plural points, thereby the end portion of the conductive layer can be prevented from being sheathed while curing processing of the tire. As a result, the releasing function of the static charge can be reliably obtained from initial stage of wear irrespective of exposed portion of the conductive layer.

According to the invention, the non-conductive rubber layer itself may constitute the tread rubber, or may constitute a cap rubber of so-called base cape structure in which a base rubber is disposed on the inner periphery of the tire. According to the invention, the base rubber may be composed of non-conductive rubber. In this case, the improvement efficiency by using the non-conductive tread rubber (in the case where the tread rubber is blended with silica at a high ratio, increase of fuel efficiency and wet braking performance) can be enhanced.

In the pneumatic tire, it is preferred that a rubber ribbon having a ribbon of a first rubber part composed of non-conductive rubber and a second rubber part composed of conductive rubber covering one face of the first rubber part is spirally wound being overlapped with each other along a circumferential direction of the tire so that one end portion of the second rubber part abuts on an abdominal region of the abutting second rubber part, the main portion and the branch portions are formed of the second rubber part. With this arrangement, the conductive layer of the pneumatic tire according to the invention can be formed easily.

In the pneumatic tire, it is preferred that the second rubber part is formed to protrude from the first rubber part in a ribbon width direction. With this arrangement, when the rubber ribbon is wound, since one end portion of the second rubber part can be easily abutted on the abdominal region of the abutting second rubber part, the conductive layer can be formed easily.

In the method for manufacturing a pneumatic tire according to the invention including a conductive layer forming process in which a conductive layer extending from a tread surface to a bottom surface or side face of the non-conductive rubber layer is formed inside the non-conductive rubber layer constituting at least outer periphery portion of the tire in a tread portion, the conductive layer forming process includes the steps of: spirally winding a rubber ribbon having a ribbon of a first rubber part composed of non-conductive rubber and a second rubber part composed of conductive rubber covering one face of the first rubber part to overlap with each other along a circumferential direction of the tire so that one end portion of the second rubber part abuts on an abdominal region of the abutting second rubber part, and forming, with the second rubber part, a conductive layer having a main portion extending from a tread surface toward an inner periphery of the tire and a plurality of branch portions branched from the main portion and extending toward an outer periphery of the tire, at least one of the branch portions being exposed to the tread surface.

According to the method for manufacturing a pneumatic tire of the invention, the conductive layer having the main portion and the branch portions as described above can be formed easily. Since the conductive layer is exposed to the tread surface at plural points, the end portion can be prevented from being sheathed while curing processing of the tire. Therefore, in the pneumatic tire manufactured according to the invention, the releasing function of the static charge can be reliably obtained from initial stage of wear irrespective of the exposed portion of the conductive layer.

In the method for manufacturing a pneumatic tire, it is preferred that the second rubber part is formed to protrude from the first rubber part in a ribbon width direction. With this arrangement, when the rubber ribbon is wound, since one end portion of the second rubber part can be abutted on the abdominal region of the abutting second rubber part, the conductive layer can be formed easily.

In the method for manufacturing a pneumatic tire, it is preferred that the second rubber part covers a inner periphery side face of the first rubber part, and in the conductive layer forming process, the rubber ribbon is wound being inclined with respect to a diameter direction of the tire toward an inner periphery of the tire. With this arrangement, the conductive layer having the main portion and the branch portions as described above can be formed easily. The face at the inner periphery side of the first rubber part means here the face that comes to the inner periphery side when the rubber ribbon is wound along the circumferential direction of the tire.

DETAILED DESCRIPTION OF THE PREFERRED EMBODIMENTS

Embodiments of the invention will be described below with reference to the accompanying drawings.

Structure of Pneumatic Tire

Figure 1:
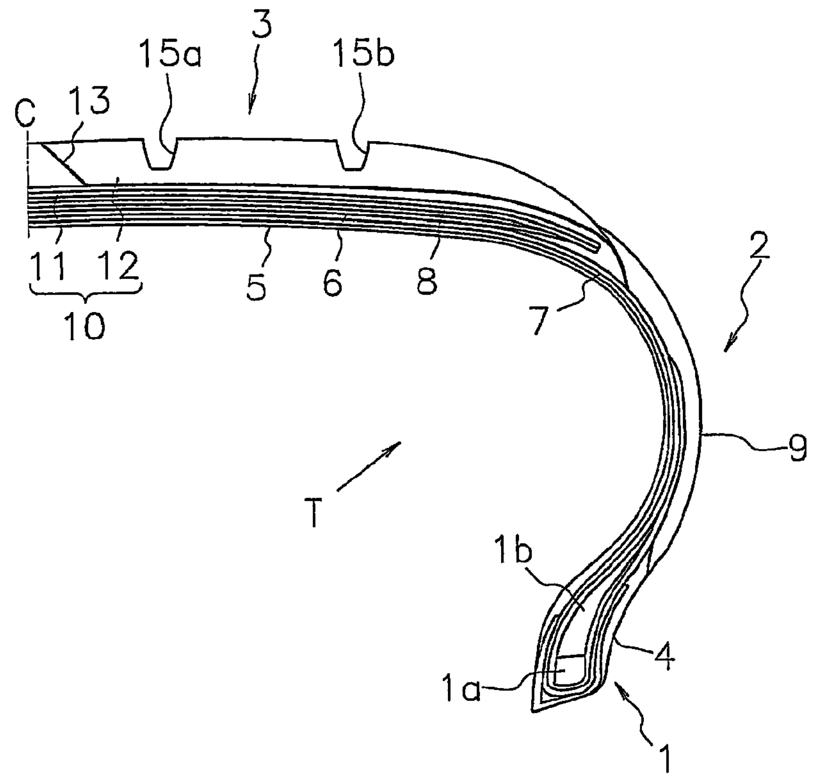
FIG. 1 is a cross sectional view of a half of a tire taken along a tire meridian illustrating an example of a pneumatic tire according to the invention.

FIG. 1 is a cross sectional view of a pneumatic tire according to the invention taken along a tire meridian thereof. A pneumatic tire T includes a pair of bead portions 1, a pair of sidewall portions 2 each extending toward the respective outer peripheries of the tire from the bead portion 1, and a tread portion 3 continuous to the respective outer peripheries of the tire located in the sidewall portion 2. The bead portion 1 includes an annular bead 1*a* composed of a bundle of steel wires or the like sheathed with rubber and a bead filler 1*b* of hard rubber disposed therein.

A carcass layer 7 is composed of at least a sheet of (in this embodiment, two sheets) carcass ply laid being bridged between the bead portions 1. The carcass ply is composed of cords sheathed with rubber extending at an angle of substantially 90° with respect to the tire equator C. Each of the ends of the carcass ply is fixed by the bead 1*a* being wound thereon. The carcass layer 7 is provided with an inner liner rubber 5 for maintaining air pressure on the inner periphery thereof.

The tread portion 3 in the carcass layer 7 is provided with a belt layer 6 composed of two sheets of belt plies on the outer periphery thereof for reinforcing the outer periphery of the tread portion 3 utilizing a hoop effect thereof. Each of the belt plies is composed of steel cords extending being inclined at an angle of approximately 25° with respect to the tire equator C. Each of the steel cords is built up so as to cross each other in the opposite directions with respect to the steel cord in the respective plies. Further, the belt layer 6 is provided with a belt reinforcement layer 8 on the outer periphery thereof.

The bead portion 1 of the carcass layer 7 is provided with a rim strip rubber 4 on the outer periphery thereof, which abuts on a rim (not shown). Also, the sidewall portion 2 of the carcass layer 7 is provided with a sidewall rubber 9 on the outer periphery thereof. According to the embodiment, the carcass ply, the rim strip rubber 4 and the sidewall rubber 9 are formed of conductive rubber. The conductive rubber is composed of raw rubber and carbon black blended as a reinforcer at a high ratio.

The belt layer 6 and the belt reinforcement layer 8 are provided with non-conductive tread rubber 10 at the outer periphery side of the tire. The non-conductive tread rubber 10 is formed with a tread pattern including main grooves 15*a* and 15*b*, which extends in the circumferential direction of the tire, and lateral grooves on the surface thereof. The tread rubber 10 according to the embodiment has a double-layered structure including a base rubber 11 and a cap rubber 12 (the non-conductive tread rubber). The cap rubber 12 constitutes an outer periphery portion of the tire in the tread portion 3 being built up on the outer periphery of the base rubber 11. Further, the tread rubber 10 employs so-called a side-on-tread structure; i.e., the outer periphery portion of the sidewall rubber 9 is built up on the outer periphery located at the end portion of the tread rubber 10.

The cap rubber 12 is formed of non-conductive rubber in which silica is blended with the raw rubber at a high ratio as a reinforcer. Within the cap rubber 12, a conductive layer 13 of conductive rubber is formed continuously in a circumferential direction of the tire. The base rubber 11 may be formed of conductive rubber. However, according to the embodiment, the conductive path is formed not extending through the base rubber 11 as described later. Therefore, the base rubber 11 may be formed of non-conductive rubber. Therefore, for example, the base rubber 11 may contain silica at a high ratio to reduce the rolling resistance of the tire; thereby fuel efficiency can be increased.

As for the conductive rubber, conductive rubbers featured with volume resistivity of less than $10^8$ Ωcm are exemplified.

The conductive rubber can be prepared by blending the following well-known conductivity imparting materials a predetermined amount. That is, in addition to the carbon black, carbon fiber and graphite are applicable from carbon group; or, metal powders metal oxide, metal flake, metal fiber are applicable from metal group. As for the non-conductive rubber, non-conductive rubber featured with volume resistivity of $10^8$ Ωcm or more is exemplified.

As for the raw rubber for the conductive rubber and the non-conductive rubber, the following are exemplified; i.e., natural rubber, styrene-butadiene rubber (SBR), butadiene rubber (BR), isoprene rubber (IR), butyl rubber (IIR) and the like. These materials may be used alone or in combination. The above raw rubber is appropriately blended with a curing agent, a cure accelerator, a plasticizer, an antioxidant and the like.

The conductive layer 13 extends from the tread surface to the bottom surface of the cap rubber 12 through the cap rubber 12. The conductive layer 13 is in contact with the sidewall rubber 9 via a boundary face between the cap rubber 12 and the base rubber 11. With this arrangement, a conductive path is formed through the rim, the rim strip rubber 4, the sidewall rubber 9 and the conductive layer 13. Static charge generated on a vehicle body and/or the tire is released to the road surface through the conductive layer 13; thereby radio noises or the like can be prevented.

Figure 2:
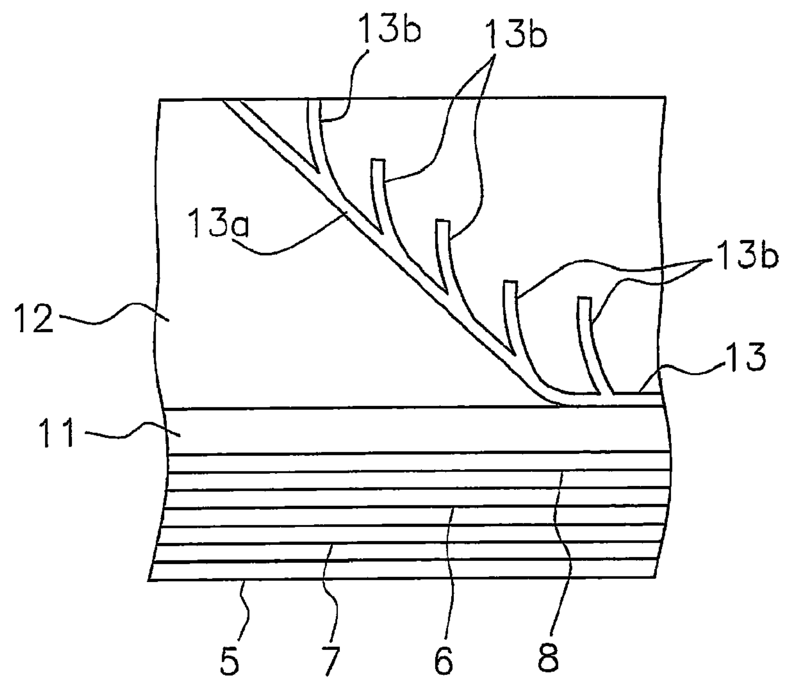
FIG. 2 is an enlarged view of an essential portion in FIG. 1.

FIG. 2 is an enlarged view of an essential portion in FIG. 1 illustrating an exposed portion of the conductive layer 13. According to the invention, the conductive layer 13 includes a main portion 13*a* extending from the tread surface toward the inner periphery of the tire and a plurality of branch portions 13*b* branched from the main portion 13*a* and extending toward the outer periphery of the tire. At least one of the branch portions 13*b* (in the embodiment, the branch portion 13*b* located at the outermost periphery of the tire) is exposed to the tread surface. As can be seen from FIG. 2, one branch portion 13*b* is exposed to the tread surface and each of the remaining branch portions 13*b* is completely embedded in non-conductive rubber. The remaining branch portions are exposed in order as the tread surface wears. In FIG. 1, the branch portions 13*b* are omitted for the convenience of illustration.

With this arrangement, conductive layers 13 can be exposed at plural (in the embodiment, two) points on the tread surface. Therefore, the end portions of the conductive layers 13 are prevented from being sheathed with rubber while the curing processing of the tire. As a result, even when the conductive layer 13 is exposed at the center portion side of the tread rubber 10 (left side in FIG. 1) like the embodiment, static charge can be reliably released from the initial stage of wear irrespective of the exposed location of the conductive layer 13. Additionally, according to the invention, the exposed portion of the conductive layer 13 is not particularly specified, but the conductive layer 13 may be exposed in a mediate portion or a shoulder portion of the tire. Therefore, the tread pattern can be designed flexibly.

The embodiment gives an example in which the main portion 13*a* extends being inclined with respect to a diameter direction of the tire and each of the branch portions 13*b* extends generally along a diameter direction of the tire. Although the invention is not limited to the above, but for the convenience of processing (to be described later), the main portion 13*a* preferably extends being inclined with respect to a diameter direction of the tire. Also, the main portion 13*a* is not limited to a linearly extending configuration but may be curved or bent as viewed in cross section.

The branch portions 13*b* that are not exposed to the tread surface at the initial stage of wear will be exposed in order as the tread rubber 10 wears. With this arrangement, since the contact between the conductive layer 13 and the road surface is appropriately ensured, the conductivity performance can be maintained up to the end stage of the wear. When the conductive layer 13 is thin as described later, this arrangement is particularly effective. The branch portions 13*b* may or may not exist on the boundary face between the cap rubber 12 and the base rubber 11.

Excluding the tread rubber 10, the pneumatic tire T is manufactured in the same manner as in the conventional art. The main portion 13*a* and the branch portions 13*b* are formed of a multi-layered rubber ribbon wound on the tire. That is, as described later, the rubber ribbon includes a ribbon of a first non-conductive rubber part and a second conductive rubber part covering one side of the first rubber part. The main portion 13*a* and the branch portions 13*b* are formed of the second rubber part.

Excepting a point that the above-described non-conductive rubber layer and the conductive layer are included, the pneumatic tire of the invention is the same as ordinary pneumatic tires. If the function to release the static charge to the road surface is ensured, any of well known conventional materials, configurations, structures and the like are applicable to the invention.

Manufacturing Method of Pneumatic Tire

Subsequently, manufacturing method of a pneumatic tire T will be described. The manufacturing method of the pneumatic tire according to the invention is the identical to the manufacturing method of ordinary tires excepting the following point. That is, when the non-conductive tread rubber 10 is formed, the conductive layer 13 is formed through the conductive layer forming process as described below.

Figure 3:
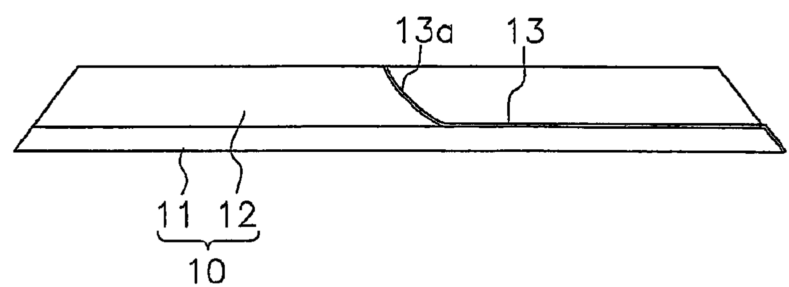
FIG. 3 is a cross sectional view of a single body of a tread rubber.

FIG. 3 is a cross sectional view of a single body of the tread rubber 10. The branch portions 13*b* are omitted in FIG. 3 for convenience of the illustration. The tread rubber 10 is bonded to other tire component members such as the carcass layer 7 and sidewall rubber 9 to form and shape a green tire. The green tire is subjected to a curing process, thus the pneumatic tire illustrated in FIG. 1 is manufactured.

The embodiment shows an example of forming the tread rubber 10 in FIG. 3, in which the base rubber 11 is formed first, and then the cap rubber 12 is built up on the outer periphery thereof. The base rubber 11 may be formed and shaped through an extrusion molding or ribbon winding. Here, the extrusion molding is a processing method in which a ribbon of rubber member having a predetermined sectional shape is formed by extrusion, and subsequently the end portions thereof are joined to each other into a ring-like shape. On the other hand, the ribbon winding is a processing method in which a rubber ribbon of a small width and small thickness is spirally wound along the circumferential direction of the tire, thereby a rubber member having a desired sectional configuration is formed and shaped.

Figure 4:
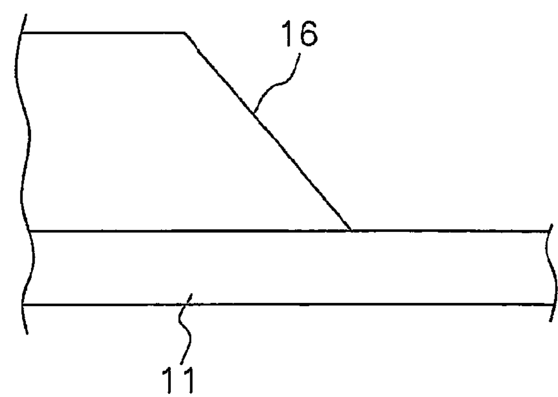
FIG. 4 is a cross sectional view schematically illustrating a process forming a conductive layer.

According to the embodiment, when the cap rubber 12 is building up on the outer periphery of the base rubber 11, an inclined plane 16 is formed in a center portion where the conductive layer 13 is exposed as illustrated in FIG. 4. That is, only a left half of the cap rubber 12 in FIG. 3 is formed and shaped first, and the side face located in the center portion is formed into the inclined plane 16. The half of the cap rubber 12 may be formed and shaped by any method of extrusion molding and ribbon winding.

Figure 5:
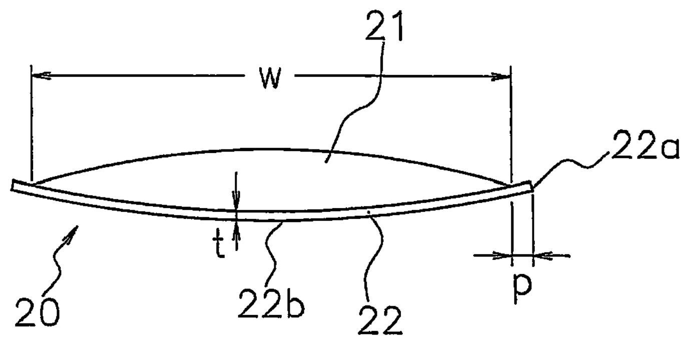
FIG. 5 is a cross sectional view of a rubber ribbon.

Subsequently, the conductive layer 13 is formed using a rubber ribbon 20 as illustrated in FIG. 5 in the ribbon winding process. The rubber ribbon 20 is a multi-layered rubber ribbon including a ribbon of a first rubber part 21 of non-conductive rubber and a second rubber part 22 of conductive rubber covering one face of the first rubber part 21. The non-conductive rubber constituting the first rubber part 21 is preferably identical to the non-conductive rubber constituting the cap rubber 12. When the rubber ribbon 20 is wound, the lower part in FIG. 5 comes to the inner periphery side, and the second rubber part 22 covers a face at the inner periphery side of the first rubber part 21.

Figure 6:
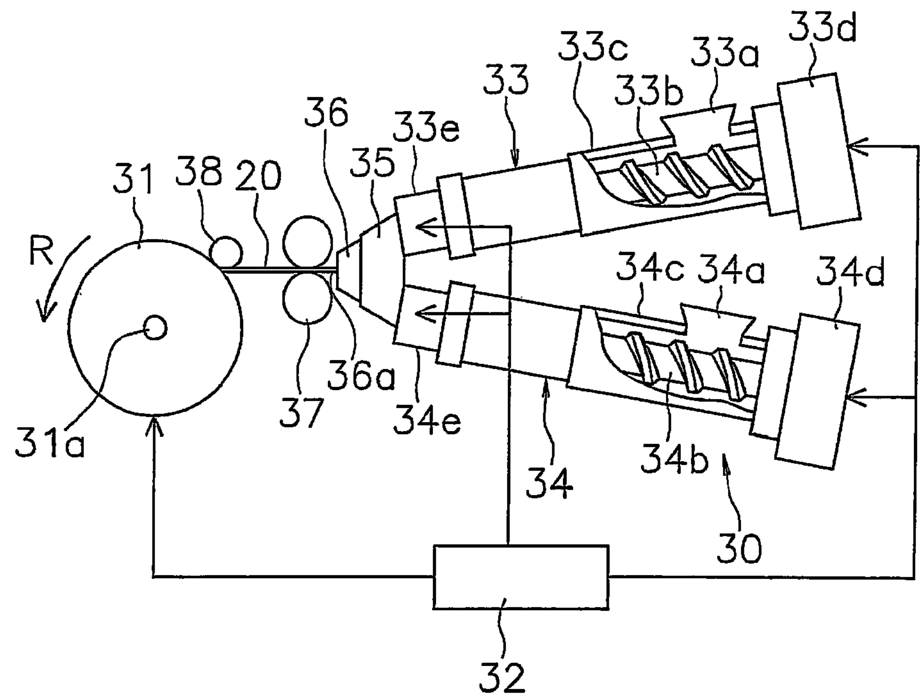
FIG. 6 is a schematic view illustrating the constitution of a manufacturing apparatus for winding the rubber ribbon.

The rubber ribbon 20 may be formed and wound by using, for example, a manufacturing apparatus illustrated in FIG. 6. The manufacturing apparatus includes a rubber ribbon forming unit 30 capable of forming the rubber ribbon 20 by extruding the non-conductive rubber and the conductive rubber simultaneously, a rotor support 31 that winds the rubber ribbon 20 supplied from the rubber ribbon forming unit 30, and a controller 32 that controls the operation of the rubber ribbon forming unit 30 and the rotor support 31.

The rubber ribbon forming unit 30 includes a pair of extruders 33 and 34, a rubber joining section 35 commonly provided at the front end of the extruders 33 and 34, and a die 36 provided to the front end of the rubber joining section 35. A discharge port 36*a* of the die 36 is opened in a shape corresponding to the sectional shape of the rubber ribbon 20. The rotor support 31 is arranged so as to rotate in an R direction around a shaft 31*a* as well as to move in a shaft direction.

The extruder 33 includes a hopper 33*a* into which a rubber material is thrown, a screw 33*b* that forwardly feeds the rubber material, a barrel 33*c* housing the screw 33*b*, a drive unit 33*d* driving the screw 33*b* and a head portion 33*e* housing a gear pump. The extruder 34 is arranged identical to the extruder 33 and includes a hopper 34*a*, a screw 34*b*, a barrel 34*c*, a drive unit 34*d* and the head portion 34*e*. The controller 32 controls to drive the screws 33*b* and 34*b* and the respective gear pumps, and to rotate and move the rotor support 31 in a shaft direction.

Rubber material of the non-conductive rubber is thrown into the hopper 33*a*, while rubber material of the conductive rubber is thrown into the hopper 34*a*. Each of the rubber materials are fed out forward while being kneaded by the respective screws 33*b* and 34*b* and supplied to the rubber joining section 35 through the respective head portions 33*e* and 34*e*. Each of the rubber materials of a prescribed amount is supplied to the rubber joining section 35 by the respective gear pumps housed by the head portions 33*e* and 34*e*.

In the rubber joining section 35, the non-conductive rubber is shaped into a shape corresponding to the first rubber part 21 in cross section, and the conductive rubber is shaped into a configuration corresponding to the second rubber part 22 in cross section. The first rubber part 21 and the second rubber part 22 are joined together, and the rubber ribbon 20 illustrated in FIG. 5 is extruded from the discharge port 36*a*. Sectional configuration of the extruded rubber ribbon 20 is further shaped by a pair of rolls 37, and fed out forward and wound on the rotor support 31 along the circumferential direction of the tire. A roller 38 is provided to press the rubber ribbon 20 onto the rotor support 31.

Figure 7:
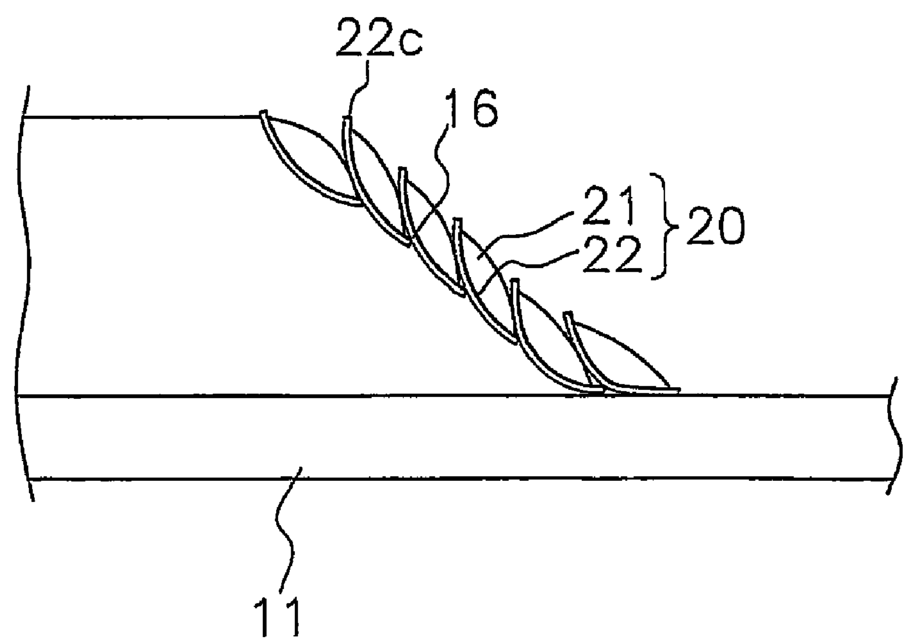
FIG. 7 is a cross sectional view schematically illustrating a conductive layer forming process.

The rubber ribbon 20 is wound on the inclined plane 16 being inclined with respect to a diameter direction of the tire toward the inner periphery of the tire as illustrated in FIG. 7. Here, the rubber ribbon 20 is spirally wound being partially overlapped with each other along the circumferential direction of the tire so that one end portion 22*a* of the second rubber part 22 abuts on the abdominal region 22*b* of the abutting second rubber part 22. With this arrangement, the second rubber part 22 has a portion extending along the inclined plane 16 and portions extending toward the outer periphery of the tire from the inclined plane 16. The former portion forms the main portion 13*a* and the latter portions form the branch portions 13*b*.

When the rubber ribbon 20 is wound, the overlapping margin or the like of the rubber ribbon 20 is controlled so that at least one branch portion 13*b* is exposed to the tread surface. The embodiment shows an example in which the rubber ribbon 20 is wound so that, in a section illustrated in FIG. 7, the end portion 22*c* of the second rubber part 22 of the second wound rubber ribbon 20 is disposed on the tread surface. The portion including an end portion 22*c* is the "branch portion 13*b* located at the outermost periphery of the tire" described above.

In an area where the branch portion 13*b* is formed, the rubber ribbon 20 is preferably overlapped with each other so that the end portion 22*a* of the second rubber part 22 abuts on the abdominal region 22*b* of the abutting second rubber part 22 within a range of 40% of ribbon width w at the both sides from the center of the rubber ribbon 20. With this arrangement, length of the branch portion 13*b* is ensured to have an appropriate and the above-described effect can be appropriately obtained. As for the ribbon width w, 10 to 40 mm is exemplified.

According to the invention, the second rubber part 22 is preferably formed to protrude from the first rubber part 21 in a ribbon width direction. FIG. 5 illustrates an example in which the second rubber part 22 protrudes at the both sides in the ribbon width direction. However, the second rubber part 22 is only required to protrude at least at the side of the end portion 22*a* that forms the main portion 13*a* to be a preferred embodiment. In this case, when the rubber ribbon 20 is wound, the end portion 22*a* of the second rubber part 22 can be easily connected to the abdominal region 22*b* of the abutting second rubber part 22. Therefore, the conductive layer 13, particularly the main portion 13*a* can be formed easily. The protrusion amount p is preferably 0.3 to 4.0 mm in view of ensuring the configuration stability of the end portion of the second rubber part 22.

After the rubber ribbon 20 has been wound on the inclined plane 16 as described above, the rubber ribbon 20 is subsequently wound on the outer peripheral surface of the base rubber 11 until the rubber ribbon 20 reaches to the end portion of the base rubber 11 in the width direction thereof. Here, the abutting second rubber parts 22 are arranged to be in contact with each other so that the conductive layer 13 continues from the center portion exceeding the end of the base rubber 11. Or, the winding of the rubber ribbon 20 may be terminated in a winding state illustrated in FIG. 7, and a sheet of rubber member made of conductive rubber may be laid on the outer peripheral surface of the base rubber 11, thereby the conductive layer 13 continues from the center portion exceeding the end of the base rubber 11.

Although the thickness of the conductive layer 13 is not particularly specified, the thickness t of the second rubber part 22 is preferably 0.2 mm or more to ensure the conductivity performance thereof. To satisfactorily obtain the improvement effect by using the non-conductive tread rubber, the volume of the conductive layer 13 is preferred to be as small as possible. According to the invention, the thickness t of the second rubber part 22 may be 1 mm or less, more preferably 0.1 mm or less. When the thickness of the conductive layer 13 is small, the conductive layer 13 tends to be sheathed by the rubber. However, according to the invention, since the conductive layer 13 is exposed at plural points, there is no problem even when the second rubber part 22 is formed thinly.

After the conductive layer 13 has been formed, the remaining half of the cap rubber 12 (right half in FIG. 3) is formed and shaped with the extrusion molding or ribbon winding to complete the tread rubber 10 illustrated in FIG. 3. As described above, by bonding the tread rubber 10 to other tire component members, the green tire is obtained. The obtained green tire is subjected to a curing process; thereby a pneumatic tire including the conductive layer 13 illustrated in FIGS. 1 and 2 is manufactured.

With the manufacturing apparatus according to the embodiment, by winding the ribbon without stopping extrusion of the rubber ribbon to continuously form the cap rubber 12, the processing efficiency can be increased. That is, when the rubber ribbon 20 is wound after the left half of the cap rubber 12 has been formed, and when the rest of the cap rubber 12 is formed to complete a cross-sectional shape after the conductive layer 13 has been formed with the rubber ribbon 20, the cap rubber 12 can be formed and shaped without stopping the extrusion of the rubber ribbon.

That is, in a state the rubber ribbon 20 can be extruded, the gear pump within the head portion 34*e* is stopped from rotating to stop the extrusion of the conductive rubber, and if necessary, the screw 34*b* also is stopped from rotating. Thereby, a rubber ribbon composed of the first rubber part 21 only is obtained. By carrying out the inverse operation, the extrusion is changed from the rubber ribbon composed of the first rubber part 21 only to a double-layered rubber ribbon 20. By controlling the above operations, the cap rubber 12 can be formed continuously. The controller 32 controls the operations of the gear pumps within the head portions 33*e* and 34*e* and the screws 33*b* and 34*b*.

Other Embodiments (1) The above-described embodiment gives an example in which the conductive layer extends from the tread surface to the bottom surface of the non-conductive rubber layer. However, the conductive layer may be extended to the side face not to the bottom surface of the non-conductive rubber layer and may be connected to conductive sidewall rubber or the like.

(2) The above-described embodiment gives an example in which the conductive layer is formed using a rubber ribbon having a flat elliptical shape in cross section. According to the invention, the configuration of the rubber ribbon is not particularly specified. The rubber ribbon may have, for example, a triangle shape in cross section. However, taking into consideration the convenience of forming the conductive layer and volume reduction of the conductive layer by reducing the thickness of the second rubber part, the conductive layer preferably has a flat shape in which the width is larger than the thickness. Further, according to the invention, the number of layers of the rubber ribbon is not particularly limited.

(3) According to the invention, the base rubber may be composed of conductive rubber and the conductive layer may be terminated at the bottom surface of the cap rubber. In this case, the conductive path is formed through the base rubber. Also, according to the invention, if the conductive layer extends to be connected to the rim, or from the rim to a conductive rubber (sidewall rubber 9 or rim strip rubber 4 in the above-described embodiment) so as to form a conductive path for releasing static charge generated on the vehicle body or the tire to the road surface, the conductive layer extending from the tread surface may be terminated at anywhere.

What is claimed is:

1. A pneumatic tire, comprising:

a non-conductive rubber layer constituting at least an outer periphery portion of the tire in a tread portion; and a conductive layer extending from a tread surface to a bottom surface or side face of the non-conductive rubber layer through the non-conductive rubber layer, wherein the conductive layer has a main portion extending from the tread surface toward the inner periphery of the tire and a plurality of branch portions branched from the main portion and extending toward the outer periphery of the tire, and at least one of the branch portions is exposed to the tread surface, and the remaining branch portions are exposed in order as the tread surface wears and each of the remaining branch portions is completely embedded in non-conductive rubber.

2. The pneumatic tire according to claim 1, wherein a rubber ribbon having a ribbon of a first rubber part composed of non-conductive rubber and a second rubber part composed of conductive rubber covering one face of the first rubber part is spirally wound being overlapped with each other along a circumferential direction of the tire so that one end portion of the second rubber part abuts on an abdominal region of the abutting second rubber part, the main portion and the branch portions are formed of the second rubber part.

3. The pneumatic tire according to claim 2, wherein the second rubber part is formed to protrude from the first rubber part in a ribbon width direction.

4. The pneumatic tire according to claim 1, wherein the tread portion has a base rubber comprising a non-conductive rubber, and a cap rubber comprising a non-conductive rubber layer laminated at an outer periphery of the base rubber, the cap rubber being divided in a tire axial direction by the main portion of the conductive layer, and the branch portions being arranged only at a position which is along an interface between the base rubber and the cap rubber and at a position which is along the surfaces of the cap rubber divided by the main portion of the conductive layer.

5. A method for manufacturing a pneumatic tire including a conductive layer forming process in which a conductive layer extending from a tread surface to a bottom surface or a side face of a non-conductive rubber layer is formed inside the non-conductive rubber layer constituting at least an outer periphery portion of the tire in a tread portion, the conductive layer forming process, comprising the steps of:

spirally winding a rubber ribbon having a ribbon of a first rubber part composed of non-conductive rubber and a second rubber part composed of conductive rubber covering one face of the first rubber part to overlap with each other along a circumferential direction of the tire so that one end portion of the second rubber part abuts on an abdominal region of the abutting second rubber part, and forming, with the second rubber part, a conductive layer having a main portion extending from a tread surface toward an inner periphery of the tire and a plurality of branch portions branched from the main portion and extending toward an outer periphery of the tire, at least one of the branch portions being exposed to the tread surface, and the remaining branch portions being designed and constructed to be exposed in order as the tread surface wears and each of the remaining branch portions being completely embedded in non-conductive rubber.

6. The manufacturing method of pneumatic tire according to claim 5, wherein the second rubber part is formed to protrude from the first rubber part in a ribbon width direction.

7. The method for manufacturing a pneumatic tire according to claim 5, wherein the second rubber part covers an inner periphery side face of the first rubber part, and in the conductive layer forming process, the rubber ribbon is wound being inclined with respect to a diameter direction of the tire toward an inner periphery of the tire.

* * * * *